United States Patent
Kang et al.

(10) Patent No.: US 7,536,163 B2
(45) Date of Patent: May 19, 2009

(54) APPARATUS AND METHOD GENERATING MULTI RF TONE SIGNALS IN UWB COMMUNICATION SYSTEM

(75) Inventors: Min-suk Kang, Daegu (KR); Tuan-anh Phan, Daejeon (KR); Eun-chul Park, Gyeonggi-do (KR); Chun-deok Suh, Gyeonggi-do (KR); Chang-wam Kim, Daejeon (KR); Sang-gug Lee, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 477 days.

(21) Appl. No.: 11/136,363

(22) Filed: May 25, 2005

(65) Prior Publication Data

US 2005/0282514 A1 Dec. 22, 2005

(30) Foreign Application Priority Data

May 25, 2004 (KR) ...................... 10-2004-0037336

(51) Int. Cl.
*H04B 1/26* (2006.01)

(52) U.S. Cl. .................... 455/316; 455/189.1; 455/209; 455/260

(58) Field of Classification Search ......... 455/205–209, 455/255–260, 313–316, 323, 334, 337–341, 455/454, 188, 189.1, 190.1; 375/324, 329, 375/334

See application file for complete search history.

(56) References Cited

U.S. PATENT DOCUMENTS

| | | | | |
|---|---|---|---|---|
| 5,898,728 | A * | 4/1999 | Sentz et al. ................. | 375/132 |
| 6,980,613 | B2 * | 12/2005 | Krivokapic ................. | 375/346 |
| 7,082,292 | B2 * | 7/2006 | Underbrink ................. | 455/255 |
| 7,130,596 | B2 * | 10/2006 | Ramachandran ......... | 455/127.1 |
| 7,139,536 | B2 * | 11/2006 | Chiu ....................... | 455/115.1 |
| 2002/0034932 | A1 * | 3/2002 | Welland .................... | 455/260 |
| 2005/0037805 | A1 * | 2/2005 | Lee et al. ................. | 455/553.1 |
| 2005/0058153 | A1 * | 3/2005 | Santhoff et al. ............ | 370/466 |
| 2005/0113045 | A1 * | 5/2005 | Santhoff et al. ............ | 455/130 |

* cited by examiner

*Primary Examiner*—Nhan T Le
(74) *Attorney, Agent, or Firm*—Staas & Halsey LLP (57) ABSTRACT

An apparatus and method for converting a frequency of a high frequency signal received from an antenna in an ultra wide band communication system transmitting and receiving using at least two reference frequencies. The method includes generating generation frequencies having frequencies set to convert the frequency of the high frequency signal and mixing the frequency of the high frequency signal and the generation frequencies in at least two stages.

9 Claims, 5 Drawing Sheets

APPARATUS AND METHOD GENERATING MULTI RF TONE SIGNALS IN UWB COMMUNICATION SYSTEM

CROSS-REFERENCE TO RELATED APPLICATIONS

This application claims the benefit under 35 U.S.C. § 119(a) from Korean Patent Application No. 2004-37336 filed on May 25, 2004 in the Korean Intellectual Property Office, the disclosure of which is incorporated herein by reference.

BACKGROUND OF THE INVENTION

1. Field of the Invention

Embodiments of the present invention generally relate to ultra wide band (UWB) communication systems. More particularly, embodiments of the present invention generally relate to apparatuses and methods generating radio frequency (RF) signals used in a multi-band of a UWB communication system.

2. Description of the Related Art

In general, communication systems use frequencies within a predetermined band to transmit and receive data. The data used in the communication systems can be classified into circuit data and packet data. The circuit data must be transmitted and received in real time, such as voice signals. The packet data has a predetermined bandwidth, or a greater bandwidth, and is not necessarily transmitted in real time, unlike the circuit data. The frequency band used to transmit the circuit data is generally narrow while the frequency band used to transmit the packet data may be wider.

As described above, when the amount of data to be transmitted increases, an increased frequency band may be used. Hereinafter, the wider frequency band can be referred to as an ultra wide band (UWB). The UWB can be divided into a plurality of sub-bands, each having a predetermined bandwidth. A UWB communication system can transmit data using the plurality of sub-bands to transmit and receive a large amount of data per unit time. The UWB communication system selects one of the plurality of sub-bands and transmits data using the selected sub-band so as to increase security for data. In other words, the UWB communication system sequentially uses the plurality of sub-bands so as to increase the security for the transmitted data.

Figure 1:
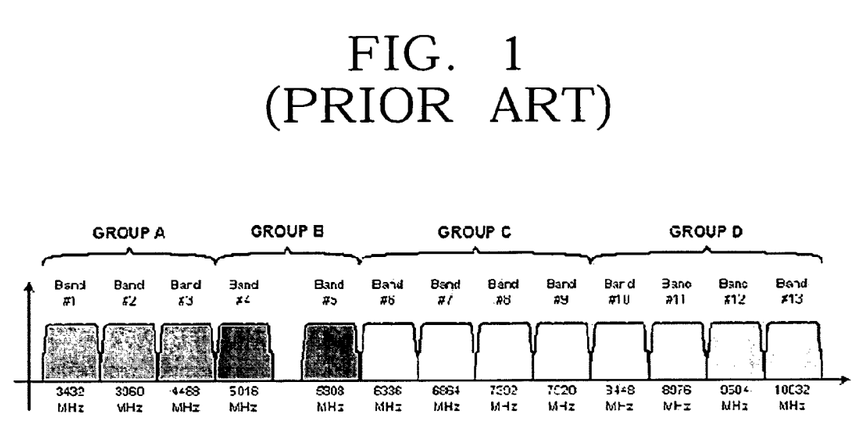
FIG. 1 illustrates exemplary sub-bands used in a UWB communication system.

FIG. 1 illustrates frequency band(s) used in a conventional UWB communication system. As shown in FIG. 1, the frequency band used in the UWB communication system can be 3432 MHz to 10032 Mhz, for example. In this example, the frequency band can be divided into four sub-band groups A, B, C and D. The group A may include three sub-bands, group B may include two sub-bands, group C may include four sub-bands, and group D may include four sub-bands In this example, reference frequencies of the three sub-bands of the group A can be 3432 MHz, 3960 MHz, and 4488 MHz, respectively, the reference frequencies of the two sub-bands of the group B can be 5016 MHz and 5808 Mhz, respectively, reference frequencies of the four sub-bands of the group C can be 6336 MHz, 6864 MHz, 7392 MHz, and 7920 MHz, respectively, and the reference frequencies of the four sub-bands of the group D can be 8448 MHz, 8976 MHz, 9504 MHz, and 10032 Mhz, respectively. The two sub-bands of the group B may overlap with frequency bands used in a currently used wireless local area network (WLAN), and in this example, the four sub-bands of the group D may not be currently used in the current level of technology.

As described above, a UWB communication system necessarily requires an appropriate structure to generate signals having reference frequencies used therein. Hereinafter, the structure of such a UWB communication system will be described, along with the corresponding method of generating the signals having the reference frequencies used in such a UWB communication system.

Figure 2:
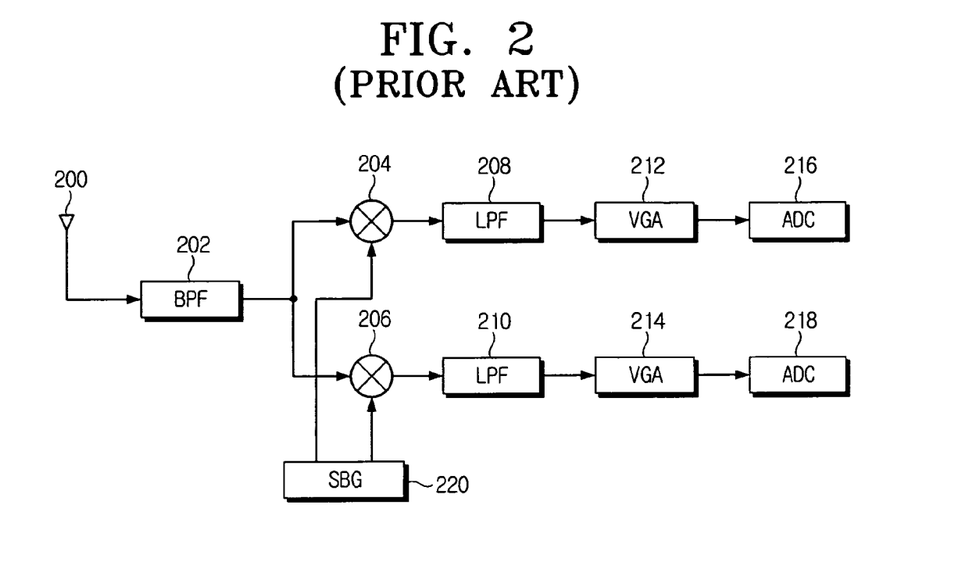
FIG. 2 illustrates a receiver of a UWB communication system.

FIG. 2 illustrates the structure of a receiver in a UWB communication system. The corresponding structure of a transmitter of such a UWB communication system can be derived based on the same.

The receiver of the UWB communication system includes an antenna 200, a band pass filter (BPF) 202, a mixing stage including mixers 204 and 206, low pass filters (LPFs) 208 and 210, variable gain amplifiers (VGAs) 212 and 214, analog-to-digital converters (ADCs) 216 and 218, and a sub-band generator (SBG) 220. In addition to these components, the UWB communication system may include additional and/or alternate components.

The antenna 200 transmits a wireless signal to and/or receives a wireless signal from the transmitter of the UWB communication system. The BPF 202 extracts only a signal having a frequency used in the UWB communication system from the wireless signal. The frequency used in the UWB communication system is generally 3 GHz to 5 GHz. The signal having passed through the BPF 202 is transmitted to the mixers 204 and 206. The mixer 204 receives a signal generated by the SBG 220. The SBG 220 will be described in detail later with reference to FIGS. 3 and 4. The SBG 220 generates both a signal that is not phase shifted and a signal that is 90° phase shifted and transmits the signal that is not phase shifted to the mixer 204 and the signal that is 90° phase shifted to the mixer 206.

The mixer 204 mixes the received signals and transmits the mixed signal to the LPF 208. The LPF 208 removes a noise component from a low frequency of the mixed signal generated in the mixing process. The LPF 208 extracts only one of a plurality of reference frequencies (which have been converted into low frequency signals through the mixing process) used in the UWB communication system. The VGA 212 corrects a magnitude of a received signal to be more constant. The ADC 216 converts a received analog signal into a digital signal. The operations of the mixer 206, the LPF 210, the VGA 214, and the ADC 218 can be the same as those of the mixer 204, the LPF 208, the VGA 212, and the ADC 216 and thus will not be described herein.

Figure 3:
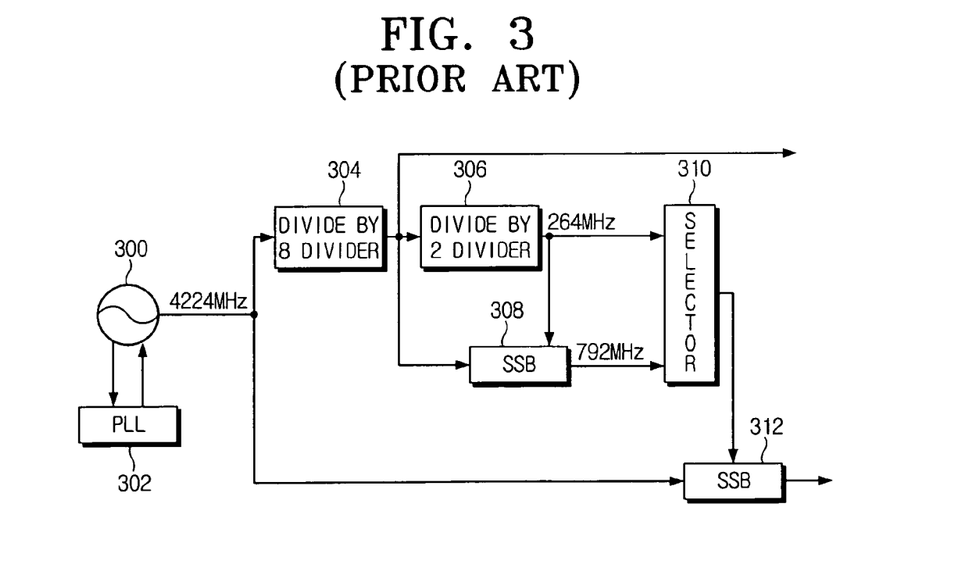
FIG. 3 illustrates an SBG generating reference frequencies used in a UWB communication system.

FIG. 3 illustrates the structure of the SBG 220 shown in FIG. 2. The SBG 220 includes a local oscillator 300, a phase-locked loop (PLL) 302, divide by 8 and divide by 2 dividers 304 and 306, single side bands (SSBs) 308 and 312, and a selector 310. The SBG 220 generating the three reference frequencies of the illustrated group A will now be described with reference to FIG. 3.

The local oscillator 300 generates a signal having a frequency of 4224 MHz. The PLL 302 stabilizes the frequency of the signal generated by the local oscillator 300. The signal generated by the local oscillator 300 is then transmitted to the divide by 8 divider 304 and the SSB 312. The divide by 8 divider 304 divides the frequency of the signal by 8. A frequency of a signal output from the divide by 8 divider 304 is 528 MHz. The signal divided by the divide by 8 divider 304 is transmitted to the divide by 2 divider 306 and the SSB 308. The divide by 2 divider 306 divides a frequency of the received signal by 2. Thus, a frequency of a signal output from the divide by 2 divider 306 is 264 MHz. The signal divided by the divide by 2 divider 306 is then transmitted to the SSB 308 and the selector 310. The SSB 308 mixes the signal having the frequency of 528 MHz and the signal having the frequency of 264 MHz to generate a signal having a frequency of 792 MHz. The signal generated by the SSB 308 is transmitted to the selector 310. The selector 310 selects one of the signals having the frequencies of 264 MHz or 792 MHz and transmits the selected signal to the SSB 312.

The SSB 312 mixes and outputs the signal having the frequency of 4224 MHz transmitted from the local oscillator 300 and one of the signals having the frequencies 264 MHz and 792 MHz selected by the selector 310. In more detail, when the SSB 312 receives the signal having the frequency of 264 MHz from the selector 310, the SSB 312 generates and outputs signals having frequencies of 3960 MHz and 4488 MHz. When the SSB 312 receives the signal having the frequency of 792 MHz from the selector 310, the SSB 312 generates and outputs a signal having a frequency of 3432 MHz. The SGB 220 thus selects and generates one of the signals having the frequencies of 3960 MHz, 4488 MHz, and 3432 Mhz, for example, using the above-described structures.

Figure 4:
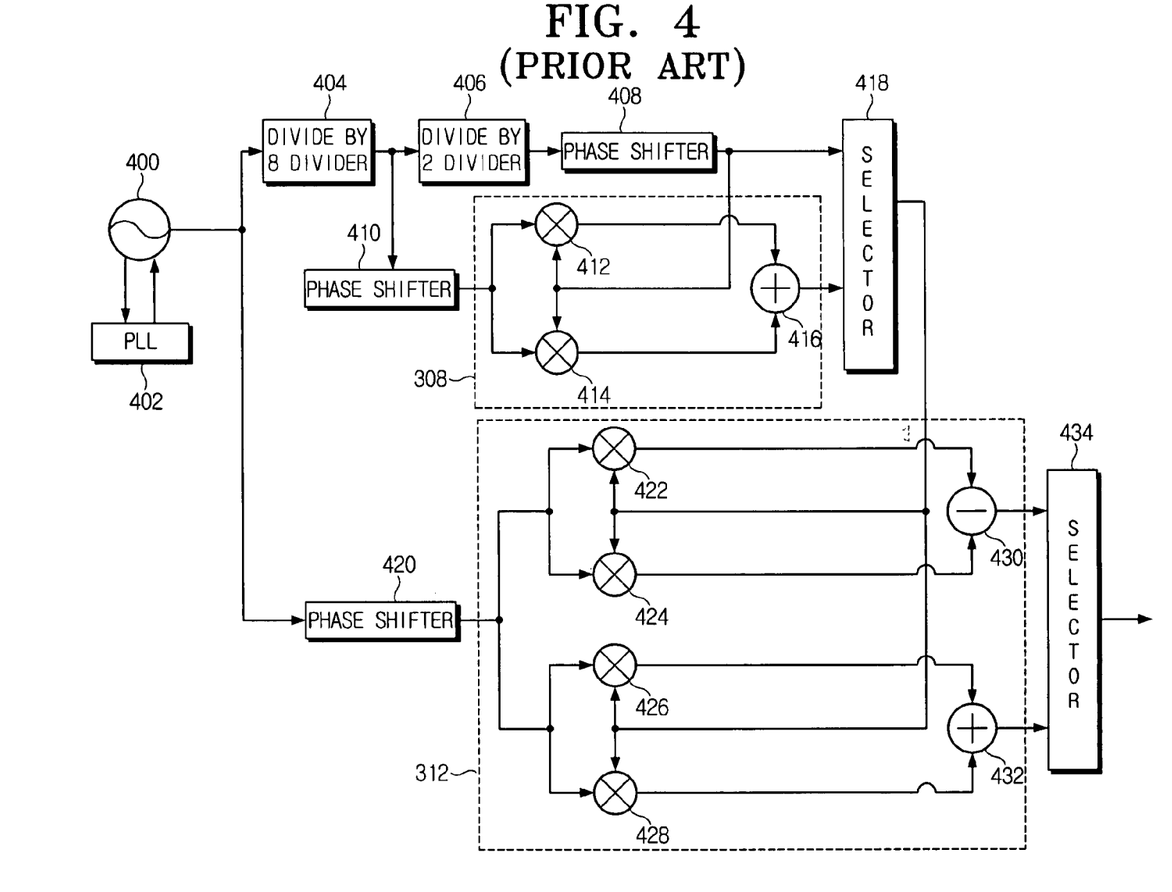
FIG. 4 illustrates another SBG generating reference frequencies.

FIG. 4 illustrates another example of an SBG. Elements in FIG. 4 similar to those of FIG. 3 will not be further described herein. Rather, hereinafter, the structure of the SBG will be described based on phase shifters 410 and 420 and SSBs 308 and 312. The phase shifters 410 and 420 generate and output signals that are phase shifted and signals that are not phase shifted. In general, the two signals output from the phase shifter 410 or 420 have a phase difference of 90°.

The operation of the SSB 308 will now be described. Here, the Q component of an intermediate frequency (IF) signal (transmitted to the phase shifter 410) is input to a mixer 412 and an I component of the IF signal is input to a mixer 414. The Q component of the IF signal input to the mixer 412 is $\sin(w_{IF}t)$, and the I component of the IF signal input to the mixer 414 is $\cos(w_{IF}t)$. An I component of a local oscillator (LO) signal (transmitted from the phase shifter 408) is input to the mixer 412, and a Q component of the LO signal is input to the mixer 414. The operations of the mixers 412 and 414 are set forth using Equations 1 and 2 below, respectively:

$$\sin(w_{LO}t)\cos(w_{IF}t) = \frac{1}{2}[\sin((w_{LO} + w_{IF})t) + \sin((w_{LO} - w_{IF})t)] \quad \text{Equation 1}$$

$$\cos(w_{LO}t)\sin(w_{IF}t) = \frac{1}{2}[\sin((w_{LO} + w_{IF})t) - \sin((w_{LO} - w_{IF})t)] \quad \text{Equation 2}$$

Equation 1 identifies the operation of the mixer 412, and Equation 2 identifies the operation of the mixer 414. The signals mixed by the mixers 412 and 414 are transmitted to an adder 416. The adder 416 adds the signals received from the mixers 412 and 414. The operation of the adder 412 is set forth below, using Equation 3:

$$\frac{1}{2}[\sin((w_{LO} + w_{IF})t) + \sin((w_{LO} - w_{IF})t)] + \quad \text{Equation 3}$$
$$\frac{1}{2}[\sin((w_{LO} + w_{IF})t) - \sin((w_{LO} - w_{IF})t)] =$$
$$\sin((w_{LO} + w_{IF})t)$$

As shown in Equation 3, the adder 416 outputs an upper side band signal having a frequency obtained by adding the frequency of the LO signal and the frequency of the IF signal. In other words, when the SSB 308 receives a signal having a frequency of 528 MHz from the phase shifter 410 and a signal having a frequency of 264 MHz from the phase shifter 408, the SSB 308 outputs a signal having a frequency of 792 MHz.

The SSB 312 performs the same operation as the SSB 308. In other words, when the SSB 312 receives a signal having a frequency of 4224 Mhz from phase shifter 420 and a signal having a frequency of 264 MHz from a selector 418, a subtracter 430 outputs a signal having a frequency of 3960 MHz. When the SSB 312 receives a signal having a frequency of 4224 MHz from phase shifter 420 and a signal having a frequency of 264 MHz from the selector 418, an adder 432 outputs a signal having a frequency of 4488 MHz. When the SSB 312 receives a signal having a frequency of 4224 MHz from the phase shifter 420 and a signal having a frequency of 792 MHz from the selector 418, the subtracter 430 outputs a signal having a frequency of 3432 MHz, and the adder 432 outputs a signal having a frequency of 5016 MHz.

As described above, the conventional SBG includes a plurality of SSBs, a plurality of dividers, a plurality of switches, and a plurality of phase shifters. Thus, this SBG consumes a large amount of power. Also, since the SBG uses a high frequency band, several parasitic components are generated in a mixing process. Thus, an I signal cannot exactly match with a Q signal. Also, isolation performance of the switches becomes deteriorated. Moreover, harmonics components are generated by the plurality of dividers and a plurality of mixers. As a result, signals having undesired frequencies are generated.

SUMMARY OF THE INVENTION

Accordingly, embodiments of the present invention may solve the above-mentioned and problems. Embodiments of the present invention include an apparatus and a method for reducing a number of components of an SBG, decreasing power consumption of the SBG.

Another embodiment of the present invention includes an apparatus and a method allowing an operation of a UWB communication system using a high frequency band to be performed in an intermediate frequency band.

To achieve the above and/or other aspects and advantages, embodiments of the present invention sets forth a method of converting a frequency of an ultra wide band (UWB) communication high frequency signal received from an antenna in an ultra wide band (UWB) communication system transmitting and receiving using at least two reference frequencies, including generating generation frequencies having frequencies set to convert the frequency of the high frequency signal, and mixing the frequency of the high frequency signal and the generation frequencies at least once to generate an intermediate frequency signal and mixing the intermediate frequency signal and the generation frequencies to generate low frequency signals used in the UWB communication system.

The at least two reference frequencies may include 3432 MHz, 3960 MHz, and 4488 MHz. In addition, the reference frequencies may respectively correspond to frequencies of sub-bands of a frequency band for UWB communication.

The generation frequencies may include at least one of 1320 MHz, 2112 MHz, 2640 MHz and 3168 MHz.

In addition, the mixing of the frequency of the high frequency signal and the generation frequencies at least once to generate the intermediate frequency signal and mixing the intermediate frequency signal and the generation frequencies to generate low frequency signals used in the UWB communication system may further include mixing the frequency of the high frequency signal with one of the generation frequencies 2112 MHz, 2640 MHz and 3168 MHz to generate the intermediate frequency, mixing the intermediate frequency with the generation frequency of 1320 MHz.

I and Q components may be extracted from the generation frequency of 1320 MHz and mixed with the intermediate frequency.

The generation frequencies of 2112 MHz and 3168 MHz may also be generated by dividing the generation frequency of 2640 MHz into frequencies of 528 MHz and mixing the frequencies of 528 MHz with the generation frequency of 2640 MHz.

To achieve the above and/or other aspects and advantages, embodiments of the present invention sets forth an apparatus for converting a frequency of a ultra wide band (UWB) communication high frequency signal received from an antenna in an ultra wide communication system transmitting and receiving using at least two reference frequencies, including a sub-band generator generating generation frequencies having frequencies set to convert the frequency of the high frequency signal, and at least two mixers respectively mixing the frequency of the high frequency signal with the generation frequencies at least once to generate an intermediate frequency signal and mixing the intermediate frequency signal and the generation frequencies to generate low frequency signals used in the UWB communication system.

The sub-band generator may generates the generation frequencies to be at least one of 1320 MHz, 2112 MHz, 2640 MHz and 3169 MHz.

The at least two mixers may include a first mixer mixing the frequency of the high frequency signal with one of the generation frequencies of 2112 MHz, 2640 MHz and 3168 MHz to generate the intermediate frequency, and second mixers mixing the intermediate frequency with the generation frequency of 1320 MHz.

The second mixers may mix the intermediate frequency with I and Q components extracted from the generation frequency of 1320 MHz transmitted from the sub-band generator. The sub-band generator may further include a divider dividing the generation frequency of 2640 MHz into a frequency of 528 MHz, and a mixer mixing the frequency of 528 MHz and the generation frequency of 2640 MHz to generate the generation frequencies of 2112 MHz and 3168 MHz.

To achieve the above and/or other aspects and advantages, embodiments of the present invention sets forth an ultra wide band (UWB) communication apparatus, including an antenna receiving a high frequency signal, a band pass filter band pass filtering the high frequency signal, a sub-band generator generating generation frequencies having frequencies set to convert the frequency of the high frequency signal, at least two mixers respectively mixing the frequency of the high frequency signal with the generation frequencies at least once to generate an intermediate frequency signal and mixing the intermediate frequency signal and the generation frequencies to generate low frequency signals used in the UWB communication system, and at least one low pass filter to low pass filter the generated low frequency signals.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Further, matters detailed in the description, such as a detailed construction and elements, are only provided to assist in a comprehensive understanding of the invention. Thus, it is apparent that embodiments of the present invention can be carried out without these detailed matters. Also, well-known functions or constructions are not described herein in detail since they would obscure the invention in unnecessary detail.

The signals generated by the SBG shown in FIG. 2 are transmitted to the LPFs 208 and 210 by performing the mixing in one stage. However, in embodiments of the present invention, signals generated by an SBG can be transmitted to LPFs by performing mixing processes in at least two stages. In other words, a two-stage mixing process can be performed to solve problems occurring in the use of a high frequency band.

Figure 5:
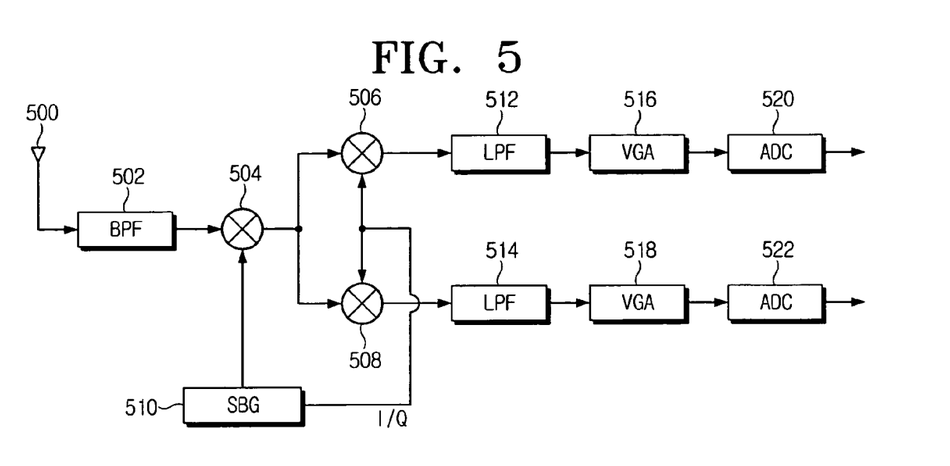
FIG. 5 illustrates a receiver of a UWB communication system, according to an embodiment of the present invention.

FIG. 5 illustrates a receiver of a UWB communication system, according to an embodiment of the present invention. Referring to FIG. 5, the receiver of the UWB communication system can include an antenna 500, a BPF 502, mixers 504, 506 and 508, LPFs 512 and 514, VGAs 516 and 518, and ADCs 520 and 522. As shown in FIG. 5, a received signal can undergo a mixing process in two stages and before being transmitted to the LPFs 512 and 514. A user may also select whether the received signal undergoes the mixing process in the at least two stages, or in a single stage, for example. In this case, a number of stages a mixing process is performed can be proportional to the number of mixers.

The antenna 500 transmits a wireless signal to and/or receives a wireless signal from a transmitter of the UWB communication system. The BPF 502 can extract only a signal having a frequency used in the UWB communication system from the wireless signal. The signal having passed through the BPF 502 is then transmitted to the mixer 504. The mixer 504 receives a signal generated by the SBG 510. The SBG 510 will be described in detail later with reference to FIGS. 6 and 7. The mixer 504 mixes the signals received from the BPF 502 and the SBG 510 and transmits the mixed signal to the mixers 506 and 508. The mixer 506 mixes the signal received from the mixer 504 with a signal received from the SBG 510 and transmits the mixed signal to the LPF 512. The LPF 512 removes a noise component from a low frequency of the mixed signal generated in the mixing process. The LPF 512 also extracts only one of a plurality of reference frequencies (which have been converted into low frequency signals through a substantial mixing process) used in the UWB communication system. The VGA 516 can then correct the magnitude of thereceived signal. The ADC 520 converts the received analog signal to a digital signal. The operations of the mixer 508, the LPF 514, the VGA 518, and the ADC 522 can be the same as those of the mixer 506, the LPF 512, the VGA 516, and the ADC 520 and thus will not be described further herein.

The transmitter of the UWB communication system can have an inverse structure to the structure of the receiver of the UWB communication system shown in FIG. 5. The structure of the SBG 510 will now be described in detail with reference to FIGS. 6 and 7.

Figure 6:
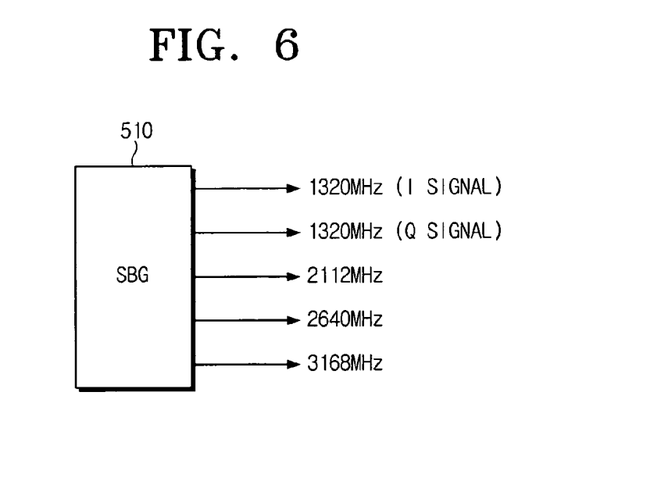
FIG. 6 illustrates frequencies generated by an SBG, according to an embodiment of the present invention.

FIG. 6 illustrates frequencies of signals generated by the SBG 510. In particular, frequencies used for generating reference frequencies of group A are shown in FIG. 6. Frequencies used for reference frequencies of the other groups, other than group A, may be generated using a corresponding method.

As shown in FIG. 6, in order to generate the reference frequencies of the group A, I and Q signals having frequencies of 1320 MHz, and signals having frequencies of 2640 MHz, 2112 MHz, and 3168 MHz are generated.

Figure 7:
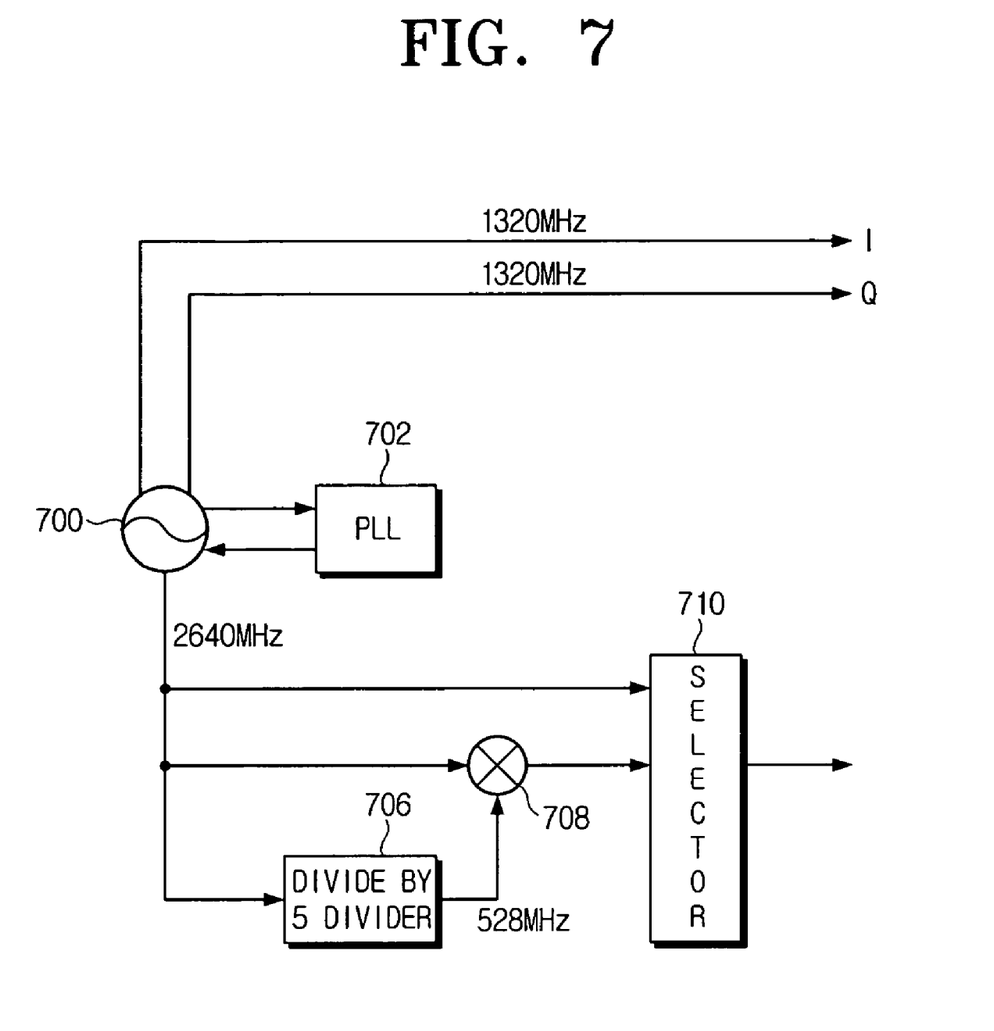
FIG. 7 illustrates an SGB generating reference frequencies, according to an embodiment of the present invention.

A process of generating the I and Q signals having the frequencies of 1320 MHz and the signals having the frequencies of 2640 MHz, 2112 MHz, and 3168 MHz using the SBG 510 will now be described with reference to FIG. 7. Hereinafter, frequencies generated by the SBG 510 will be referred to as generation frequencies.

The SBG 510 can include a local oscillator 700, a PLL 702, a divide by 5 divider 706, a mixer 708, and a selector 710. The number of components of the SBG 510 shown in FIG. 7 is smaller than the number of components of the SBG shown in FIG. 2. The SBG 510, according to an embodiment of the present invention, will now be described in greater detail with reference to FIG. 7.

The local oscillator 700 generates signals having frequencies of 1320 MHz and 2640 MHz. The local oscillator 700 generally generates the signals having the frequencies of 1320 MHz and simultaneously a signal having a frequency twice the frequency of 1320 MHz, that is, a frequency of 2640 MHz. The local oscillator 700 can also generate I and Q signals from the signals having the frequencies of 1320 MHz. I and Q signals having the frequencies of 1320 MHz generated by the local oscillator 700 can then be transmitted to the mixers 506 and 508. The PLL 702 stabilizes the frequencies of the I and Q signals generated by the local oscillator 700.

The signal having the frequency of 2640 Mhz, generated by the local oscillator 700, is transmitted to the selector 710, the mixer 708, and the divide by 5 divider 706. The divide by 5 divider 706 divides the frequency of 2640 MHz of the signal transmitted from the local oscillator 700. Thus, the divide by 5 divider 706 transmits a signal having a frequency of 528 Mhz, generated by dividing the frequencies of 2640 Mhz, to the mixer 708. The mixer 708 mixes the signal having the frequency of 2640 MHz received from the local oscillator 700 and the signal having the frequency of 528 MHz received from the divide by 5 divider 706. The mixer 708 generates a signal having a frequency of 2112 MHz and a signal having a frequency of 3168 MHz by performing the mixing process. The signals generated by the mixer 708 are transmitted to the selector 710. The selector 710 selects one of the transmitted signals and transmits the selected signal to the mixer 504. An example of a method of generating reference frequencies in sub-bands of group A is thus shown in FIG. 7. However, reference frequencies in sub-bands of the other groups, other than group A, may be generated using a method similar to the method shown in FIG. 7.

Operations of the mixers 504, 506 and 508 will be described below with reference to FIG. 5.

The mixer 504 mixes the signal received from the BPF 502 with one of the signals having the frequencies 2112 MHz, 2640 MHz, and 3168 MHz received from the SBG 510. Due to the mixing process performed by the mixer 504, the signal having a high frequency component transmitted from the BPF 502 is converted into a signal in an intermediate frequency band. The signal in the intermediate frequency band is transmitted to the mixers 506 and 508.

The mixer 506 mixes the signal in the intermediate frequency band received from the mixer 504 with a signal, e.g., the I signal, received from the local oscillator 700. The mixer 508 also mixes the signal in the intermediate frequency band received from the mixer 504 with a signal, e.g., the Q signal received from the local oscillator 700. The number of mixers shown in FIG. 5 is greater than the number of mixers shown in FIG. 2. However, the frequencies of the signals transmitted to the mixers 506 and 508 are lower than the frequency of the signal transmitted to the mixer 504. In general, a mixing process performed in a low frequency band has higher reliability and lower power consumption than a mixing process performed in a high frequency band. Thus, although the number of mixers shown in FIG. 5 is greater than the number of mixers shown in FIG. 2, the mixers shown in FIG. 5 consume less power than the mixers shown in FIG. 2. Since the SBG 510 can have a simple structure, e.g., as shown in FIG. 7, the total power consumption of the transmitter and the receiver of the UWB communication system, according to an embodiment of the present invention, is smaller than the total power consumption of the transmitter and the receiver of the UWB communication system shown in FIG. 2.

Table 1 below shows comparisons between frequencies of signals transmitted to the mixers 204 and 208 and frequencies of signals transmitted to the mixers 504, 506, and 508.

TABLE 1

| FIG. 2 | | FIG. 5 | | |
|---|---|---|---|---|
| Mixer 204 | Mixer 208 | Mixer 504 | Mixer 506 | Mixer 508 |
| High frequency signal (I signal) (3 GHz to 5 GHz), 3432 MHz, 3960 MHz, 4488 MHz | High frequency signal (Q signal) (3 GHz to 5 GHz) 3432 MHz, 3960 MHz, 4488 MHz | High frequency signal (3 GHz to 5 GHz) 2112 MHz, 2640 MHz, 3168 MHz | Low frequency signal (I signal), 1320 MHz | Low frequency signal (Q signal), 1320 MHz |

As described above, signals having lower frequencies than frequencies of signals transmitted to conventional mixers are transmitted to mixers of embodiments of the present invention. In other words, high frequencies of transmitted signals can be converted into low frequencies using a two-stage mixing process. Further, errors occurring in each component of the present invention and overall power consumption can be reduced.

As described above, in embodiments of the present invention, a high frequency transmitted from an antenna of the UWB communication system can be converted into a low frequency using at least a two-stage mixing process. Power consumption of each component can be reduced, and the probability of an error occurring can be lowered. Also, an SBG can generate I and Q signals from one frequency so as to reduce errors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of converting a frequency of an ultra wide band (UWB) communication high frequency signal received from an antenna in an ultra wide band (UWB) communication system transmitting and receiving using at least two reference frequencies, comprising:
   generating generation frequencies having frequencies set to convert the frequency of the high frequency signal;
   mixing the high frequency signal with a portion of the generation frequencies to generate a mixed signal; and
   mixing the mixed signal with other generation frequencies, other than the portion of the generation frequencies, to generate low frequency signals used in the UWB communication system,
   wherein the at least two reference frequencies comprise at least one of 3432 MHz, 3960 MHz, and 4488 MHz,
   wherein the reference frequencies respectively correspond to frequencies of sub-bands of a frequency band for UWB communication, and
   wherein the mixing of the high frequency signal and the portion of the generation frequencies generates an intermediate frequency signal and the mixing of the mixed signal and the other generation frequencies to generate low frequency signals used in the UWB communication system comprises:
   mixing the high frequency signal with one of the generation frequencies 2112 MHz, 2640 MHz and 3168 MHz to generate the intermediate frequency; and
   mixing the intermediate frequency with the generation frequency of 1320 MHz.

2. The method of claim 1, wherein I and Q components are extracted from the generation frequency of 1320 MHz and mixed with the intermediate frequency.

3. A method of converting a frequency of an ultra wide band (UWB) communication high frequency signal received from an antenna in an ultra wide band (UWB) communication system transmitting and receiving using at least two reference frequencies, comprising:
   generating generation frequencies having frequencies set to convert the frequency of the high frequency signal;
   mixing the high frequency signal with a portion of the generation frequencies to generate a mixed signal; and
   mixing the mixed signal with other generation frequencies, other than the portion of the generation frequencies, to generate low frequency signals used in the UWB communication system,
   wherein the generation frequencies comprise at least one of 1320 MHz, 2112 MHz, 2640 MHz and 3168 MHz, and
   wherein the generation frequencies of 2112 MHz and 3168 MHz are generated by dividing the generation frequency of 2640 MHz into frequencies of 528 MHz and mixing the frequencies of 528 MHz with the generation frequency of 2640 MHz.

4. An apparatus for converting a frequency of a ultra wide band (UWB) communication high frequency signal received from an antenna in an ultra wide communication system transmitting and receiving using at least two reference frequencies, comprising:
   a sub-band generator generating generation frequencies having frequencies set to convert the frequency of the high frequency signal;
   a first mixer mixing the high frequency signal with a portion of the generation frequencies to generate a mixed signal; and
   at least one second mixer mixing the mixed signal with other generation frequencies, other than the portion of the generation frequencies, to generate low frequency signals used in the UWB communication system,
   wherein the first mixer and the at least one second mixer comprise:
   the first mixer mixing the frequency of the high frequency signal with one of the generation frequencies of 2112 MHz, 2640 MHz and 3168 MHz to generate the intermediate frequency; and
   the at least one second mixer mixing the intermediate frequency with the generation frequency of 1320 MHz.

5. The apparatus of claim 4, wherein the at least one second mixer mixes the intermediate frequency with I and Q components extracted from the generation frequency of 1320 MHz transmitted from the sub-band generator.

6. An apparatus for converting a frequency of a ultra wide band (UWB) communication high frequency signal received from an antenna in an ultra wide communication system transmitting and receiving using at least two reference frequencies, comprising:
   a sub-band generator generating generation frequencies having frequencies set to convert the frequency of the high frequency signal;
   a first mixer mixing the high frequency signal with a portion of the generation frequencies to generate a mixed signal; and
   at least one second mixer mixing the mixed signal with other generation frequencies, other than the portion of the generation frequencies, to generate low frequency signals used in the UWB communication system,
   wherein the sub-band generator generates the generation frequencies to comprise at least one of 1320 MHz, 2112 MHz, 2640 MHz and 3169 MHz, and
   wherein the sub-band generator comprises:
   a divider dividing the generation frequency of 2640 MHz into a frequency of 528 MHz; and
   a mixer mixing the frequency of 528 MHz and the generation frequency of 2640 MHz to generate the generation frequencies of 2112 MHz and 3168 MHz.

7. An ultra wide band (UWB) communication apparatus, comprising:
   an antenna receiving a high frequency signal;
   a band pass filter band pass filtering the high frequency signal;

a sub-band generator generating generation frequencies having frequencies set to convert the frequency of the high frequency signal;

at least two mixers respectively mixing the frequency of the high frequency signal with the generation frequencies at least once to generate an intermediate frequency signal and mixing the intermediate frequency signal and the generation frequencies to generate low frequency signals used in the UWB communication system; and at least one low pass filter to low pass filter the generated low frequency signals, wherein the sub-band generator generates the generation frequencies to comprise at least one of 1320 MHz, 2112 MHz, 2640 MHz and 3169 MHz, and wherein the at least two mixers comprise:

a first mixer mixing the frequency of the high frequency signal with one of the generation frequencies of 2112 MHz, 2640 MHz and 3168 MHz to generate the intermediate frequency; and second mixers mixing the intermediate frequency with the generation frequency of 1320 MHz.

8. The communication apparatus of claim 7, wherein the second mixers mix the intermediate frequency with I and Q components extracted from the generation frequency of 1320 MHz transmitted from the sub-band generator.

9. An ultra wide band (UWB) communication apparatus, comprising:

an antenna receiving a high frequency signal;

a band pass filter band pass filtering the high frequency signal;

a sub-band generator generating generation frequencies having frequencies set to convert the frequency of the high frequency signal;

at least two mixers respectively mixing the frequency of the high frequency signal with the generation frequencies at least once to generate an intermediate frequency signal and mixing the intermediate frequency signal and the generation frequencies to generate low frequency signals used in the UWB communication system; and at least one low pass filter to low pass filter the generated low frequency signals, wherein the sub-band generator generates the generation frequencies to comprise at least one of 1320 MHz, 2112 MHz, 2640 MHz and 3169 MHz, and wherein the sub-band generator comprises:

a divider dividing the generation frequency of 2640 MHz into a frequency of 528 MHz; and a mixer mixing the frequency of 528 MHz and the generation frequency of 2640 MHz to generate the generation frequencies of 2112 MHz and 3168 MHz.

* * * * *